United States Patent
Mazzei (10) Patent No.: US 8,713,778 B2
(45) Date of Patent: May 6, 2014

(54) METHOD OF ADJUSTING A VEHICLE DOOR

(75) Inventor: David Mazzei, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 112 days.

(21) Appl. No.: 13/468,969

(22) Filed: May 10, 2012

(65) Prior Publication Data

US 2013/0298352 A1 Nov. 14, 2013

(51) Int. Cl.
*B23Q 17/00* (2006.01)
*B23P 11/00* (2006.01)
*B21D 53/88* (2006.01)

(52) U.S. Cl.
USPC ............ 29/407.1; 29/897.2; 29/434; 29/464; 29/468; 29/525.11

(58) Field of Classification Search
CPC .......... B23P 19/04; B26D 65/06; E05Y 2900/50–2900/51; E05D 3/125; E05D 3/1278
USPC ............. 29/897.2, 407.01, 407.09, 464, 795, 29/428, 434, 525.01, 525.02, 525.11, 29/281.1, 281.5; 16/245, 242, 235, 384; 296/146.11, 202
See application file for complete search history.

(56) References Cited

U.S. PATENT DOCUMENTS

| | | | |
|---|---|---|---|
| 4,375,716 A * | 3/1983 | Armstrong et al. | 29/404 |
| 4,861,099 A | 8/1989 | Sasamura et al. | |
| 5,203,811 A * | 4/1993 | Hirotani et al. | 29/407.05 |
| 5,570,498 A * | 11/1996 | Hipkiss et al. | 16/258 |
| 6,405,424 B1 | 6/2002 | Ferguson | |
| 6,643,905 B2 | 11/2003 | Rhoads et al. | |
| 6,910,254 B2 | 6/2005 | Aoki et al. | |
| 7,059,020 B2 * | 6/2006 | Sitter | 16/382 |
| 2009/0288345 A1 | 11/2009 | Capelli et al. | |

* cited by examiner

*Primary Examiner* — Sarang Afzali
(74) *Attorney, Agent, or Firm* — Rankin, Hill & Clark LLP (57) ABSTRACT

A method and system for mounting and adjusting a vehicle door rotatably connected to a vehicle body by upper and lower hinges with hinge holes. The upper and lower hinges are positioned to the vehicle body and the vehicle door by aligning the hinge holes to corresponding receiving holes. The vehicle door is temporarily mounted to the vehicle body by inserting cam bolts into aligned pairs of the hinge holes and the receiving holes. The vehicle door is adjusted to a desired position relative to the vehicle body by rotating the cam bolts. The desired positioned is secured by inserting mounting bolts into empty aligned pairs of the hinge holes and the receiving holes and replacing the cam bolts with mounting bolts.

9 Claims, 9 Drawing Sheets

METHOD OF ADJUSTING A VEHICLE DOOR

BACKGROUND

The present disclosure generally relates to a method and an apparatus for adjusting a vehicle door when installing the vehicle door on a vehicle.

During vehicle assembly, vehicle doors are mounted on a vehicle body and positioned to fit properly within corresponding openings in the vehicle body. Preferably, the vehicle doors are positioned to provide flushness with respect to the vehicle body and adjacent doors, and provide uniform gap spacing between the vehicle doors and an adjacent vehicle frame. Typically, door position adjustments are made by bluntly striking door hinges, thereby moving the door in an upper, lower, forward or reward direction. After each adjustment, the door gaps are measured at several locations with the vehicle door in each of an open and closed position to ensure uniform spacing around the vehicle door and the vehicle frame. Additionally, vehicle bodylines and door flushness are visually assessed. These steps are reiterated for each door until a proper fit is achieved.

A drawback of this door adjustment process is that it is time-consuming and imprecise since calibrated adjustments cannot be made by striking the door hinges. Additionally, each strike can cause stress, drop and rise to the door. Furthermore, since adequate clearance is needed to strike the hinges, each door as well as a fender, must be installed separately and subsequently adjusted in relation to each other. Accordingly, the present door adjustment process does not allow the vehicle doors and/or the fender to be precisely positioned and aligned on the vehicle body simultaneously without causing unnecessary stress to the vehicle body and the vehicle doors.

SUMMARY

According to one aspect, a method for mounting and adjusting a vehicle door is provided for a vehicle door that is rotatably connected to a vehicle body by upper and lower door hinges, each hinge having a body-side arm and a door-side arm, each arm having at least one hinge hole and the arms being connected for rotation relative to each other. The method includes positioning the body-side arm to the vehicle body and the door-side arm to the vehicle door by aligning the hinge holes of the body-side and door-side arms to corresponding receiving holes on the vehicle body and the vehicle door. The method further includes inserting cam bolts into at least one aligned pair of the hinge holes and the receiving holes to temporarily mount the vehicle door while allowing movement of the vehicle door relative to the vehicle body. The vehicle door is adjusted to a desired position relative to the vehicle body by rotating the cam bolts. To secure the desired position of the vehicle door relative to the vehicle body, mounting bolts are inserted into at least one empty aligned pair of the hinge holes and the receiving holes. Additionally, the cam bolts are replaced with the mounting bolts.

According to another aspect, a vehicle door adjuster system is provided for adjusting a vehicle door on a vehicle body. The system includes a set of vehicle door hinges, each hinge having a body-side arm and a door-side arm, each arm having at least one hinge hole, the arms being pivotally connected to each other. The system further includes at least one cam bolt received in the hinge hole of each arm, thereby holding the vehicle door in place while allowing relative movement of the vehicle door. The cam bolt is configured such that rotation thereof allows for adjusting a position of the vehicle door along an X axis, Y axis and/or Z axis relative to the vehicle body. The system also includes a set of fasteners to be received in the hinge holes and replace the cam bolt thereby securing the vehicle door in the adjusted position.

According to still another aspect, a method for simultaneously adjusting a front and rear vehicle door on a vehicle body is provided. The front and rear vehicle doors each have upper and lower hinges and each hinge has a body-side arm and a door-side arm. The method includes aligning hinge holes of the upper and lower hinges to corresponding receiving holes on the vehicle body and the vehicle doors. The method also includes attaching the upper and lower hinges to the vehicle body and the vehicle doors with cam bolts to temporarily hold the vehicle doors in place while allowing relative movement of the vehicle doors. The method further includes adjusting the vehicle doors to respective desired positions by rotating the cam bolts in relation to each other. The desired position is secured by fasteners and the cam bolts are replaced with the fasteners.

DETAILED DESCRIPTION

Figure 1:
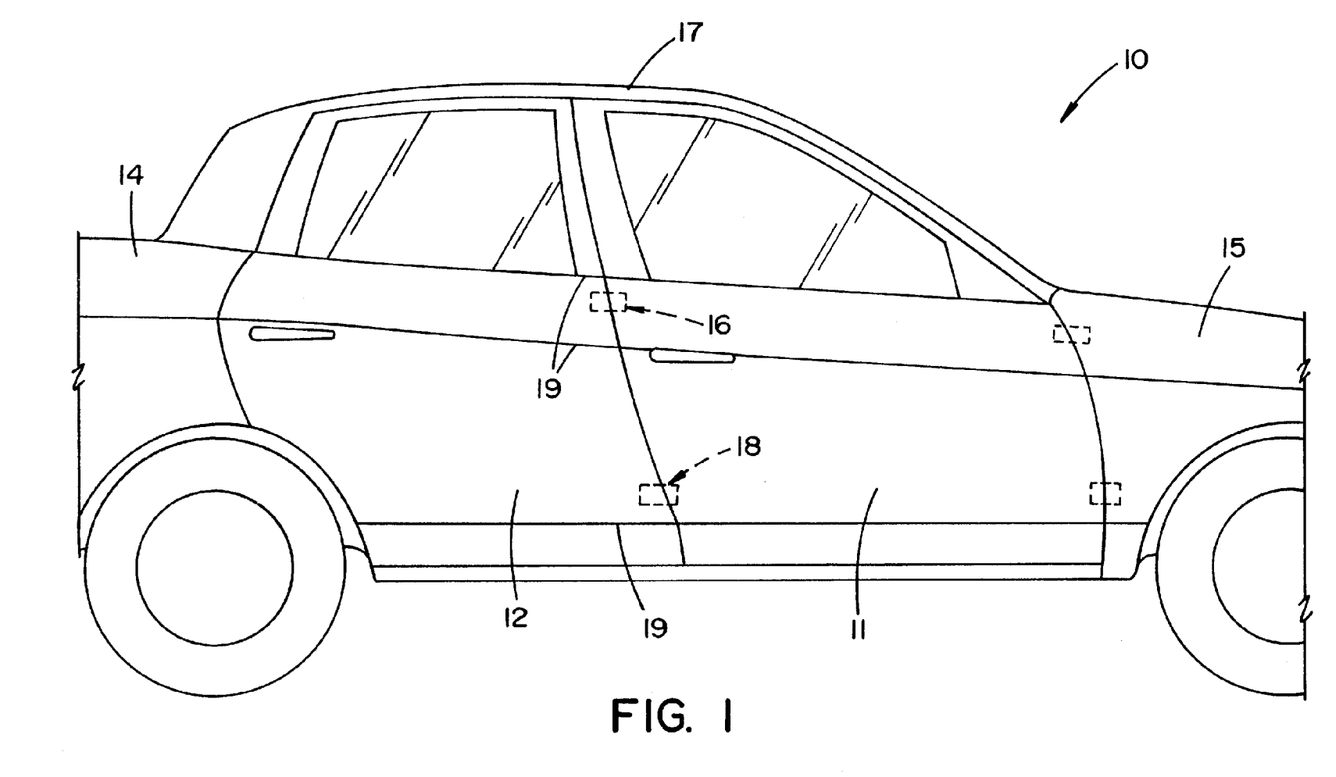
FIG. 1 is a perspective view of a vehicle incorporating a vehicle door adjuster system.

Referring now to the drawings, wherein the showings are for purposes of illustrating one or more exemplary embodiments and not for purposes of limiting same, FIG. 1 illustrates a vehicle 10 incorporating a vehicle door adjuster system of the present invention. As will be appreciated by those skilled in the art, the vehicle door adjuster system may be used to mount and position one or more vehicle doors on a vehicle body 14. The vehicle 10 may be, for example, a two-door or four-door vehicle. For purposes of explaining the vehicle door adjuster system, the vehicle 10 is a four-door vehicle with a front vehicle door 11, a rear vehicle door 12 and a fender 15. A vehicle body frame 17 defines the vehicle body 14. The front vehicle door 11 and the rear vehicle door 12 are positioned within the vehicle body frame 17.

The vehicle door adjuster system of the illustrated embodiment includes an upper hinge 16 and a lower hinge 18, which rotatably connect the rear vehicle door 12 to the vehicle body 14. For purposes of explaining the illustrated vehicle door adjuster system, the upper hinge 16 and the lower hinge 18 will be described with reference to the rear vehicle door 12. However, it is to be appreciated that the front vehicle door 11 may have one or more hinges. The vehicle 10 also includes bodylines 19, which are horizontal boundary lines dividing the upper and lower parts of the side of the vehicle body 14. The vehicle door adjuster system of the illustrated embodiment may use one or more bodylines, for example, bodylines 19, as a reference point for adjusting and aligning one or more vehicle doors on the vehicle 10.

Figure 2:
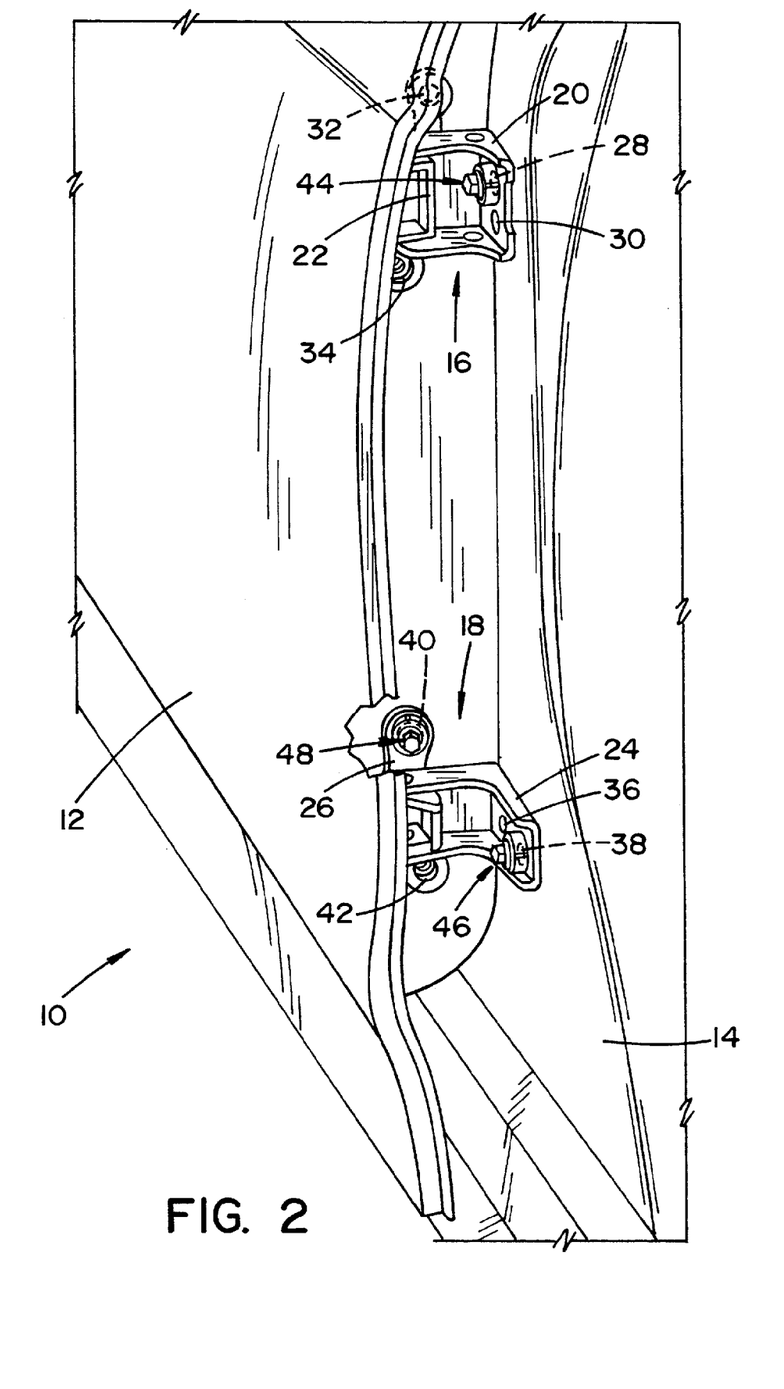
FIG. 2 is a perspective view of the vehicle door adjuster system for aligning and attaching a rear vehicle door to a vehicle body.

FIG. 2 is a perspective view of the vehicle door adjuster system for aligning and attaching the vehicle door 12 to the vehicle body 14. The upper hinge 16 and the lower hinge 18 each include two arms. Specifically, the upper hinge 16 includes a body-side arm 20 and a door-side arm 22. The lower hinge 18 includes a body-side arm 24, and a door-side arm 26. Each set of arms 20, 22 and 24, 26 are connected together for rotation relative to each other.

The arms 20, 22 and 24, 26 also include at least one hinge hole. FIG. 2 illustrates each arm 20, 22 and 24, 26 having two hinges holes, however any appropriate number of hinge holes may be present. In FIG. 2, the body-side arm 20 of the upper hinge 16 includes a hinge hole 28 above and adjacent to a hinge hole 30. The door-side arm 22 of the upper hinge 16 includes hinge hole 32 above and spaced apart from a hinge hole 34. The body-side arm 24 of the lower hinge 18 includes a hinge hole 36 adjacent and laterally spaced (to the left in FIG. 2) relative to a hinge hole 38. The door-side arm 26 of the lower hinge 18 includes a hinge hole 40 above and spaced apart from a hinge hole 42. As will be understood and appreciated by those skilled in the art, the hinge holes may be in different locations and have varying sizes to permit proper mounting on the vehicle body 14 and the vehicle door 12. The hinge holes preferably are sized and aligned according to corresponding receiving holes. For example, in FIG. 4, the hinge holes 28, 30 are aligned according to the corresponding receiving holes 70 on the vehicle body 14.

Figure 3:
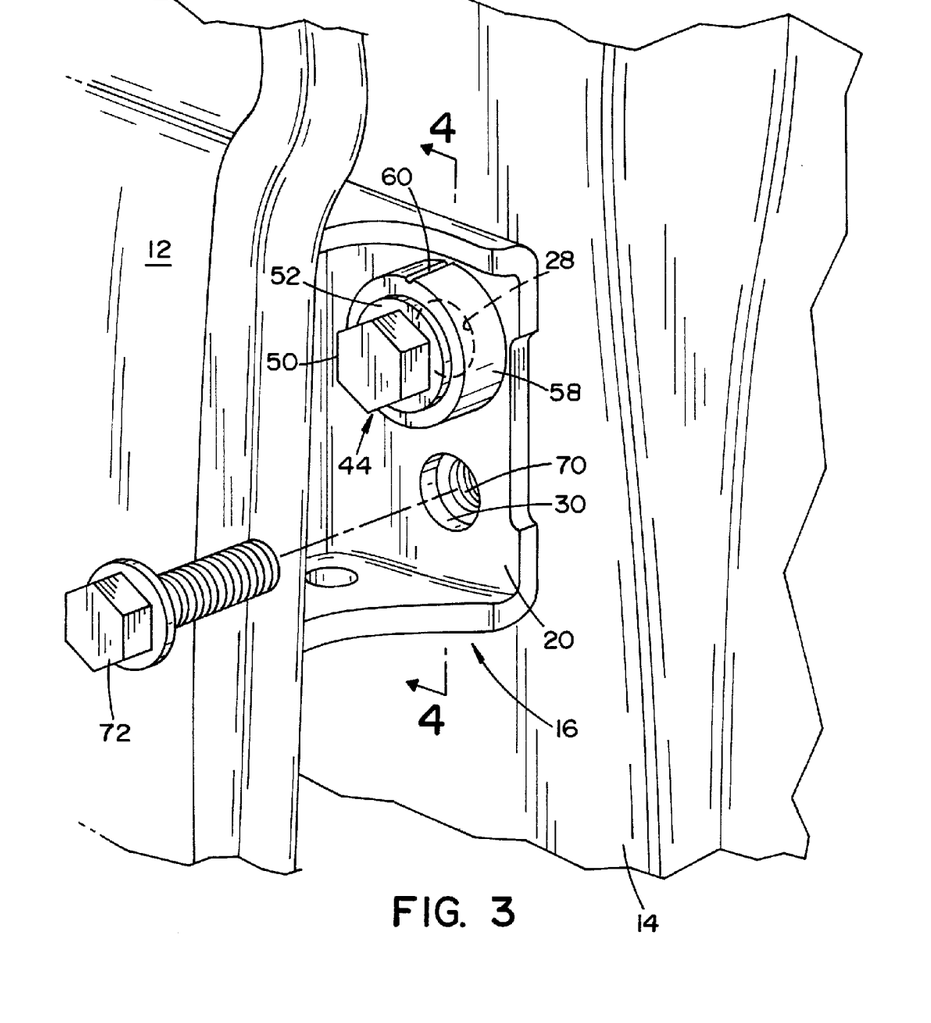
FIG. 3 is a perspective view of an upper hinge attached to the vehicle body of the vehicle door adjuster system of FIG. 2.

The vehicle door adjuster system of the illustrated embodiment also includes at least one cam bolt to be received into at least one aligned pair of the hinge holes and the receiving holes. As will be described in more detail below, the cam bolt holds the vehicle door 12 in place while allowing relative movement of the vehicle door 12 so that the vehicle door 12 can be positioned properly. Referring again to FIG. 2, the upper hinge 16 includes a first cam bolt 44 received into the hinge hole 28. The lower hinge 18 includes a second cam bolt 46 received into the hinge hole 38 and a third cam bolt 48 received into the hinge hole 40. A detailed perspective view of the upper hinge 16 with the first cam bolt 44 can be seen in FIG. 3.

Figure 6:
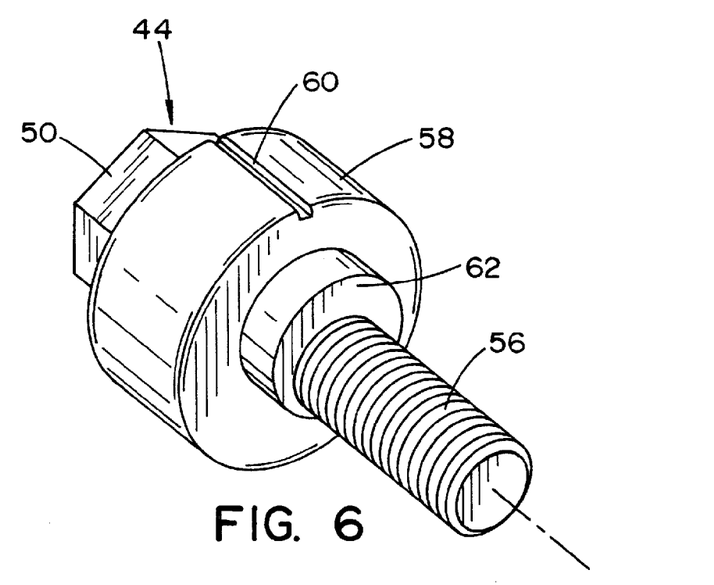
FIG. 6 is a perspective view of a cam bolt.
Figure 7:
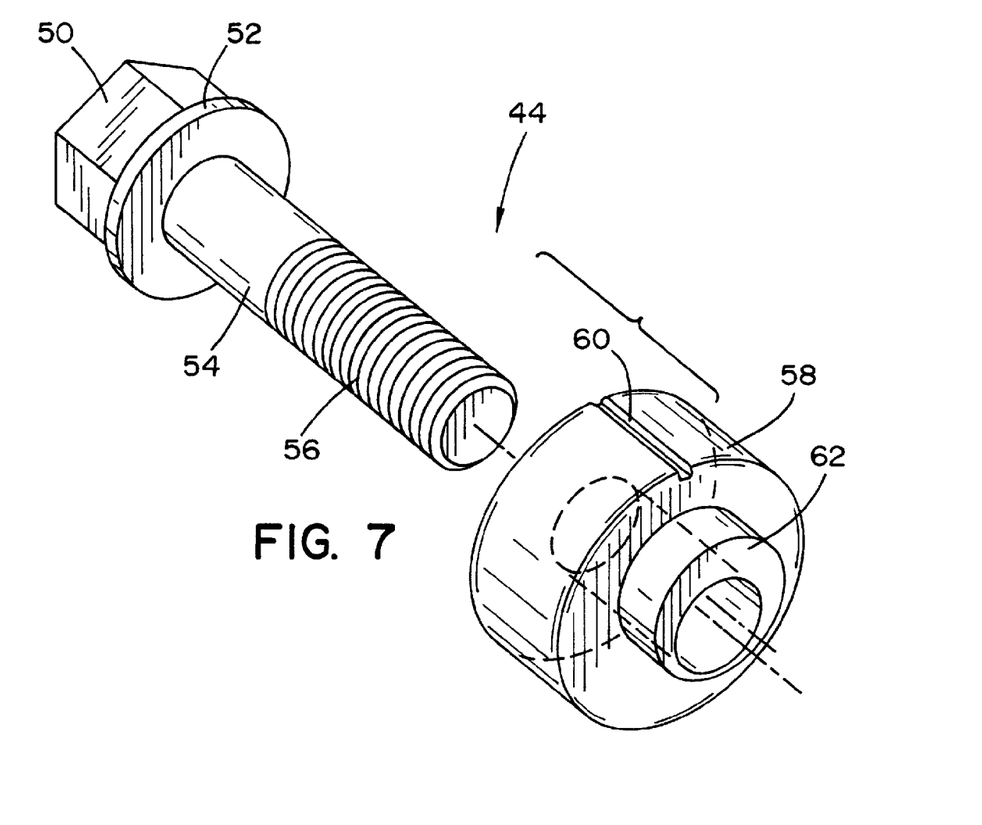
FIG. 7 is an exploded perspective view of the cam bolt of FIG. 6.

The structure of the cam bolts are best explained with reference to FIGS. 6 and 7. FIG. 6 is a perspective view of a cam bolt, for example, the first cam bolt 44. FIG. 7 is an exploded view of the cam bolt of FIG. 6. The first cam bolt 44 includes a hex head 50, a stop collar 52, a shaft 54 with a threaded portion 56. The first cam bolt 44 further includes a cam coupling 58, the cam coupling 58 having an eccentric cam lobe 62. As will be appreciated by those skilled in the art, the cam coupling 58 may be a different shape or size than that depicted in FIGS. 6 and 7.

The cam coupling 58 and the eccentric cam lobe 62 are configured to provide an offset of the shaft 54. Specifically, the shaft 54 is inserted into the cam coupling 58 causing a centerline of the shaft 54 to be offset from a centerline of the eccentric cam lobe 62. The cam coupling 58 may be rotated a precise amount of degrees. The amount of degrees may be predetermined and indicated by a marking 60 on the cam coupling 58. As will be appreciated by those skilled in the art, the cam coupling 58 may have more than one marking in different locations on the surface of the cam coupling 58. Rotation of the cam coupling 58 causes translational movement of the upper hinge 16 thereby creating translational and/or rotational movement of the vehicle door 12.

Figure 4:
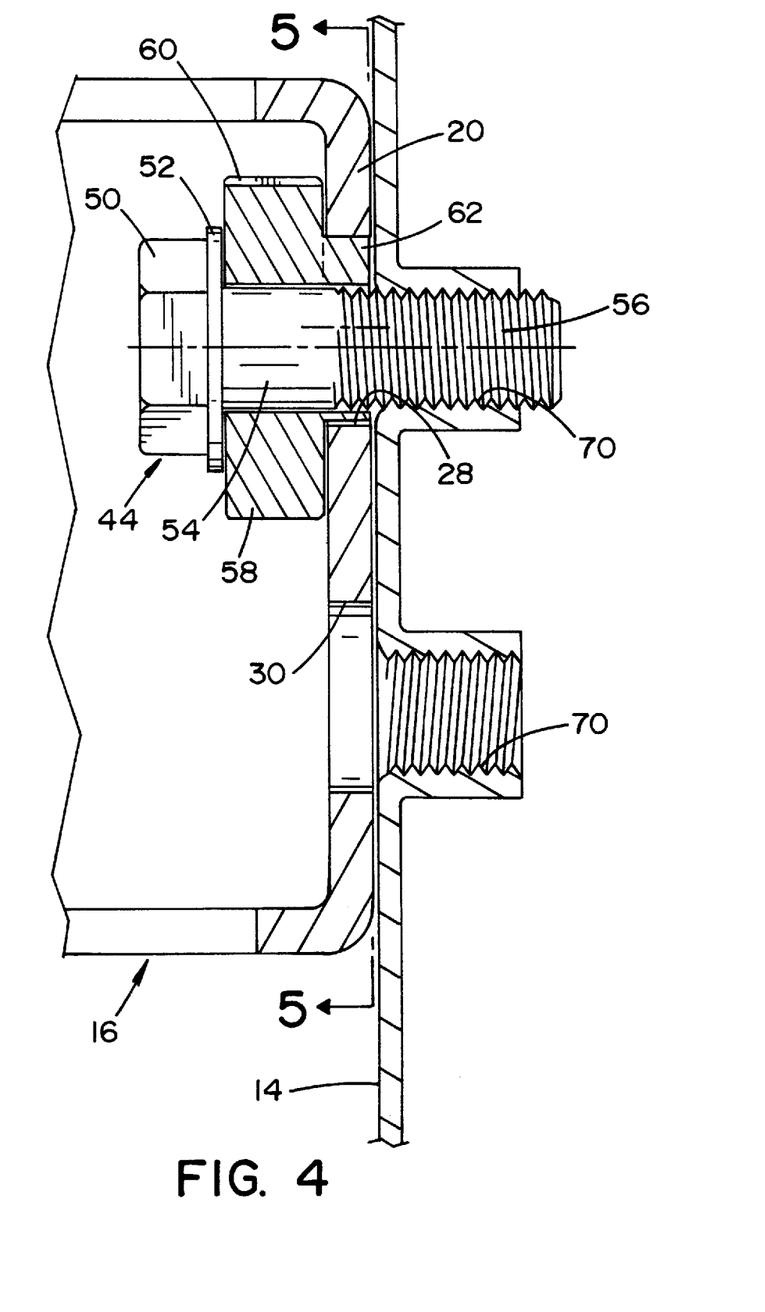
FIG. 4 is a cross-sectional view of the upper hinge taken along the line 4-4 of FIG. 3.

As discussed above, and shown in FIG. 4, the cam bolts are received into the hinge holes and subsequently received into the corresponding receiving holes. FIG. 4 is a cross-sectional view of the upper hinge 16 and the first cam bolt 44 taken along the line 4-4 of FIG. 3. The shaft 54 with threaded portion 56 of the first cam bolt 44 is received into the hinge hole 28 of the body-side arm 20 and into the corresponding receiving hole 70 of the vehicle body 14. The cam bolts are received such that the vehicle door 12 is mounted and held in place on the vehicle body 14 while allowing for relative movement of the vehicle door 12.

Figure 5:
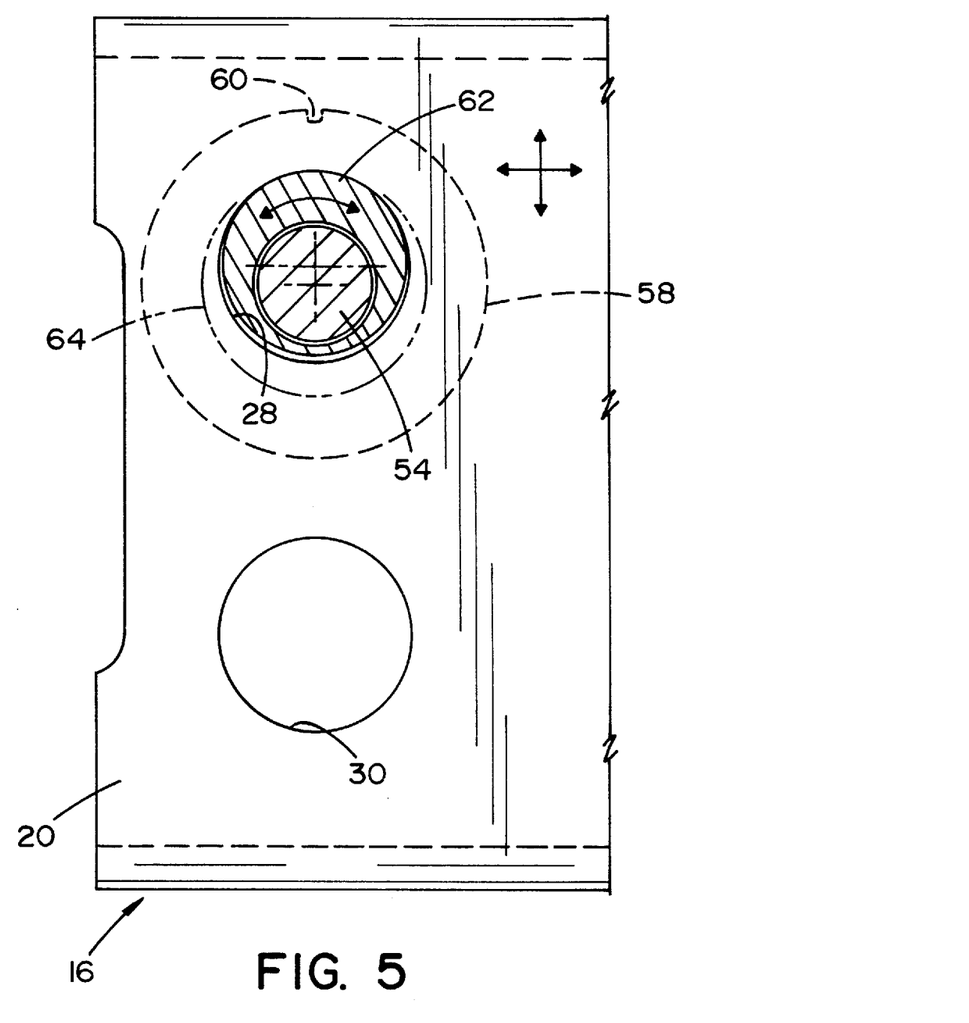
FIG. 5 is a cross-sectional view of the upper hinge taken along the line 5-5 of FIG. 4.

Referring now to FIG. 5, a cross sectional view of the upper hinge 16 and the first cam bolt 44 taken along the line 5-5 of FIG. 4 is shown. The cam coupling 58 of the first cam bolt 44 can be precisely rotated a predetermined amount of degrees to position the eccentric cam lobe 62 within a target zone 64 of the hinge hole 28. The predetermined amount of degrees may be indicated by the marking 60 on the cam coupling 58. The cam coupling 58 may be rotated in a clockwise or counter clockwise direction. In one exemplary embodiment, the cam coupling 58 can only rotate in a counter clockwise direction.

Rotation of the cam coupling 58 of the first cam bolt 44 adjusts a position of the upper hinge 16 and thereby adjusts a position of the vehicle door 12 in relation to the vehicle body 14. The vehicle door 12 can be adjusted in a X axis, Y axis and/or Z axis direction. Furthermore, a vehicle door 12 may be rotated about a X axis, Y axis and/or Z axis. Rotation of one or more of the cam bolts, via one or more cam couplings, of the illustrated vehicle door adjuster system allows for precise positioning of a vehicle door 12 in relation to the vehicle body 14. The cam bolts may be adjusted or rotated individually or simultaneously. For example, an electric motor (not shown) may adjust the cam bolts simultaneously.

Figure 8:
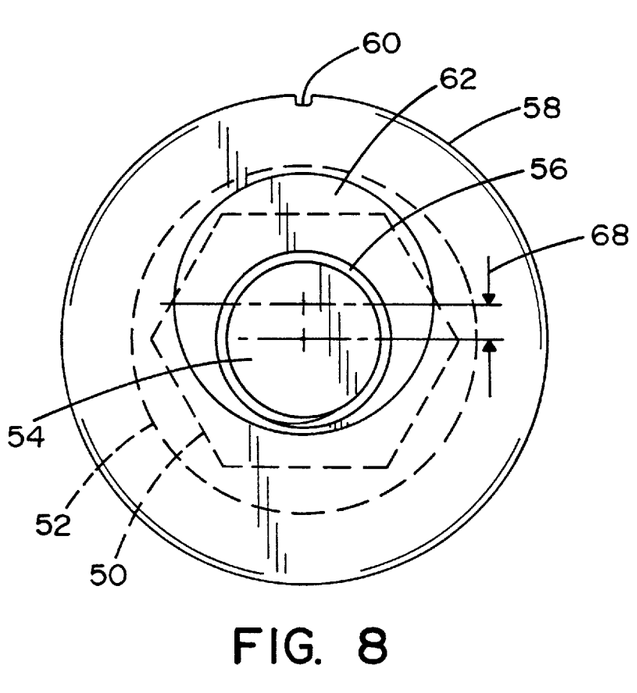
FIG. 8 is an in-view of a cam bolt.

Referring now to FIG. 8, an in-view of the first cam bolt 44 is shown. The cam bolts of the vehicle door adjuster system may have varying offsets relative to one another. An offset 68 is defined as the spacing between a centerline of the shaft 54 and a centerline of the eccentric cam lobe 62. Varying offsets allows for precise positioning of the cam bolts within the target zone 64 (FIG. 5). For example, the offsets of each cam bolt may decrement in relation to each other. Specifically, the offsets may decrement by 0.4 mm.

Referring again to FIG. 3, the vehicle adjuster system also includes a set of fasteners (i.e. fastener 72) to be received in the hinges holes and replace the cam bolts thereby securing the vehicle door 12 in an adjusted position. The fasteners 72 may be any means or device for connecting and securing the vehicle door 12, for example, bolts (e.g., hex bolts), rivets, etc.

Figure 9:
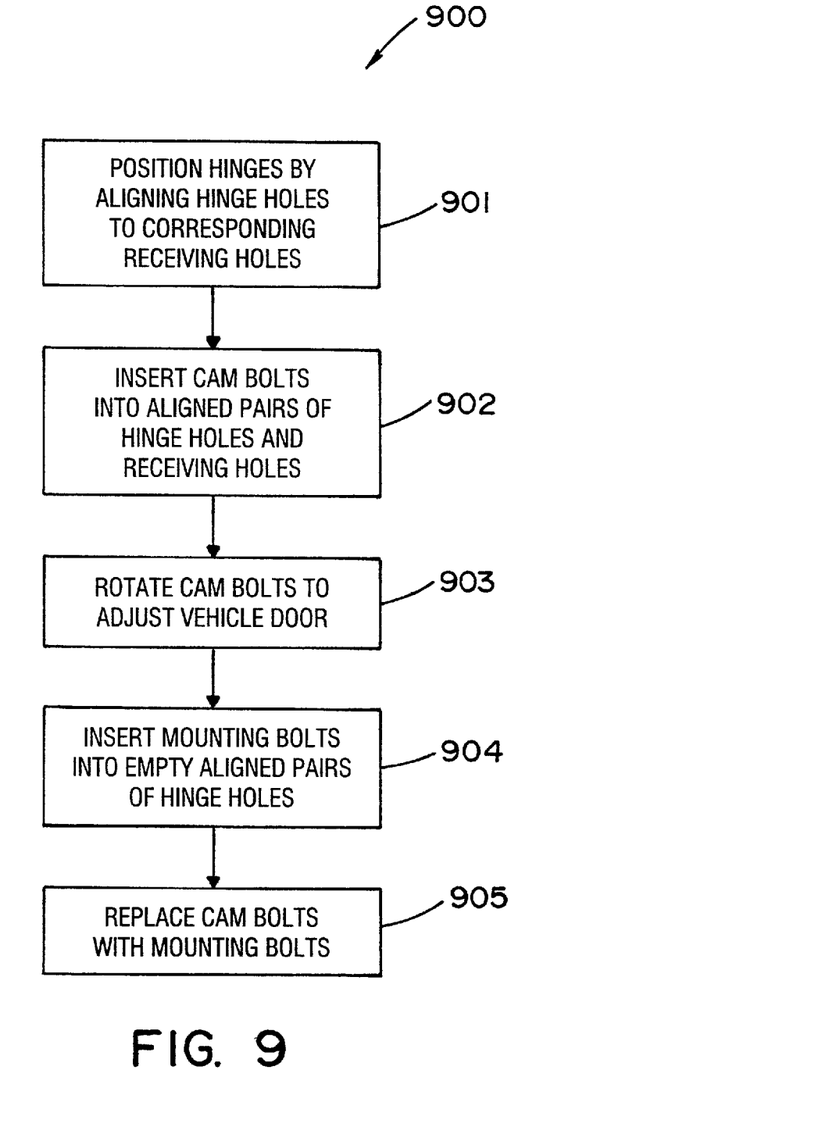
FIG. 9 is a flow chart of a method for mounting and adjusting a vehicle door.

With reference to FIG. 9, a method 900 for mounting and adjusting a vehicle door rotatably connected to a vehicle body by upper and lower hinges will now be described. In particular, the method 900 will be described in association with the vehicle door adjuster system illustrated in FIGS. 1-8, though it is to be appreciated that the method could be used with other vehicle door adjuster systems. In the method, the vehicle door 12 is rotatably connected to the vehicle body 14 by upper and lower hinges 16,18. The upper hinge 16 has a body-side arm 20 and a door-side arm 22. The lower hinge 18 has a body-side arm 24 and a door-side arm 26. Each set of arms 20,22 and 24,26 facilitate mounting and connecting the hinges 16,18 to the vehicle body 14 and the vehicle door 12.

Each arm has at least one hinge hole, although it is to be appreciated that the arms may have one or more hinge holes. In one exemplary embodiment, shown in FIG. 2, each arm has a first hinge hole and a second hinge hole adjacent to one another. In FIG. 2, the body-side arm 20 of the upper hinge 16 includes a hinge hole 28 above and adjacent to a hinge hole 30. The door-side arm 22 of the upper hinge 16 includes a hinge hole 32 above and spaced apart from a hinge hole 34. The body-side arm 24 of the lower hinge 18 includes a hinge hole 36 adjacent and laterally spaced (to the left in FIG. 2) relative to a hinge hole 38. The door-side arm 26 of the lower hinge 18 includes a hinge hole 40 above and spaced apart from a hinge hole 42. The arms 20,22 and 24,26 are connected for rotation relative to each other to allow the vehicle door 12 to move from an open to a closed position.

At step 901, the body-side arms 20, 24 and the door-side arms 22, 26 are positioned to the vehicle body 14 and the vehicle door 12, respectively. The arm hinge holes 28, 30, 32, 34, 36, 38, 40, 42 are aligned with corresponding receiving holes (i.e. receiving holes 70, FIG. 4) on the vehicle body 14 and the vehicle door 12. At step 902, cam bolts are inserted into at least one aligned pair of the hinge holes and the receiving holes to temporarily mount the vehicle while allowing movement of the vehicle door relative to the vehicle body. For example, a first cam bolt 44 may be inserted into a first hinge hole 28 of the body-side arm 20 of the upper hinge 16, a second cam bolt 46 may be inserted into a first hinge hole 38 of the body-side arm 24 of the lower hinge 18 and a third cam bolt 48 may be inserted into a first hinge hole 40 of the door-side arm 26 of the lower hinge 18. Depending on the configuration of the hinges and the hinge holes, one or more cam bolts may be inserted into any of the hinge holes as desired.

At step 903, the vehicle door is adjusted to a desired position relative to the vehicle body by rotating the cam bolts. The cam bolts may be rotated in relation to one another. Rotation of the cam bolts causes translational movement of the vehicle door 12 relative to the vehicle body 14 in an X axis, Y axis and/or Z axis direction. Rotation of the cam bolts may also cause rotational movement about an X axis, Y axis and/or Z axis. For example, the first cam bolt 44, the second cam bolt 46 and the third cam bolt 48 may be rotated in relation to one another to adjust the vehicle door 12 to a desired position. In another example, the first cam bolt 44 and the second cam bolt 46 may be rotated in relation to one another thereby changing an angle of the vehicle door 12 relative to the vehicle body 14. The cam bolts may be rotated a predetermined amount of degrees as indicated by a marking on the cam bolt. For example, the cam bolt 44 can be rotated in a clockwise or counter clockwise position a precise amount of degrees as indicated by a marking 60. Thus, precise and calibrated adjustments can be made to the vehicle door position.

Referring to FIGS. 6 and 7, the cam bolts, for example first cam bolt 44, each include an eccentric cam lobe 62 and a bolt shaft 54. The bolt shaft 54 extends through the eccentric cam lobe 62. The cam bolt 44 may have an offset between a centerline of the eccentric cam lobe 62 and a centerline of the bolt shaft 54. Each cam bolt may have varying offsets relative to each other. The varying offsets ensure a proper fit of the cam bolt into the hinge holes.

Rotation of the cam bolts is continued until a desired position or a best fit of the vehicle door 12 to the vehicle body 14 is obtained. The desired position is defined by the X axis, Y axis and/or Z axis positioning required to provide vehicle door 12 to vehicle body 14 flushness and uniform spacing between the vehicle door 12 and a vehicle body frame 17 on the vehicle body 14.

At step 904, mounting bolts (i.e. mounting bolt 72, FIG. 2) are inserted into at least one empty aligned pair of the hinge holes. At step 905, the cam bolts are replaced with the mounting bolts to secure the desired position of the vehicle door relative to the vehicle body.

Figure 10:
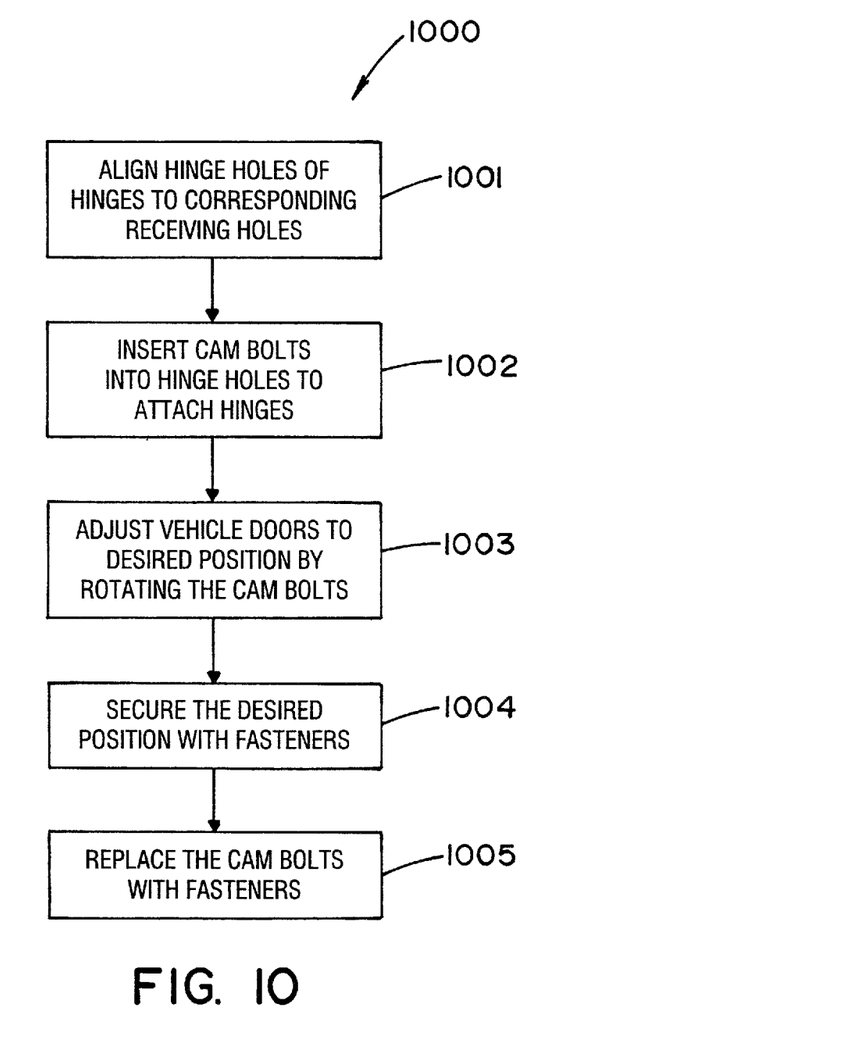
FIG. 10 is a flow chart of a method for simultaneously adjusting a front and rear vehicle door on a vehicle body.

With reference to FIG. 10, another method 1000 for simultaneously mounting and adjusting a front vehicle door 11 and a rear vehicle door 12, each vehicle door having upper and lower hinges, is illustrated and will now be explained in association with the vehicle door adjuster system illustrated in FIGS. 1-8, though it is to be appreciated that the method could be used with other vehicle door adjuster systems. In the method, at step 1001, hinge holes of the upper and lower hinges are aligned with corresponding receiving holes on the vehicle body and the vehicle doors. For example, in FIG. 2, the vehicle door 12 has an upper hinge 16 and a lower hinge 18. In FIG. 4, the upper hinge 16 is shown aligned with receiving holes 70. At step 1002, the upper and lower hinges are attached to the vehicle body and vehicle door by inserting cam bolts into at least one aligned pair of the hinges holes and the receiving holes. For example, the upper and lower hinges 16, 18 are attached to the vehicle body 14 and the vehicle doors by inserting cam bolts 44, 46, 48 into the aligned pairs of the hinges holes 28, 38, 40 and the receiving holes 70. The cam bolts 44, 46, 48 temporarily hold the vehicle doors in place while allowing relative movement of the vehicle doors. The cam bolts 44, 46, 48 may have varying offsets relative to one another for positioning each cam bolt 44, 46, 48 within a target zone 64 of the hinge holes 28, 38, 40.

At step 1003, the vehicle doors are adjusted to a desired position by rotating the cam bolts 44, 46, 48. Rotation of the cam bolts 44, 46, 48 causes a rotational movement of the vehicle doors in relation to the vehicle body 14. Additionally, rotation causes translational movement of the vehicle doors in a horizontal longitudinal direction, a vertical direction and a horizontal transverse direction. Thus, cam bolt rotation allows the vehicle doors to be positioned for a best fit within a vehicle body frame 17 of the vehicle body 14. The desired position is preferably defined by the vehicle door positioning required to provide flushness of the vehicle doors to the vehicle body 14, uniform spacing between the vehicle doors 11,12 and the vehicle body frame 17 on the vehicle body 14 and aligned vehicle bodylines 19. The cam bolts on the vehicle doors can be rotated simultaneously in relation to each other to achieve the desired positions. Additionally, a fender 15 may be simultaneously installed while adjusting the vehicle doors. At step 1004, the desired positions of the vehicle doors are secured with fasteners (i.e. fastener 72, FIG. 2) and at step 1005, the cam bolts are replaced with the fasteners 72. By adjusting the front vehicle door 11 and the rear vehicle door 12 simultaneously with the fender 15 on the vehicle body 14, all three components can be positioned and aligned precisely without causing unnecessary stress to the components and the vehicle 10.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for mounting and adjusting a vehicle door rotatably connected to a vehicle body by upper and lower door hinges, each hinge having a body-side arm and a door-side arm, each arm having at least one hinge hole, the body-side and door-side arms connected for rotation relative to each other, comprising:

positioning the body-side arm to the vehicle body and the door-side arm to the vehicle door and aligning the hinge holes of the body-side and door-side arms to corresponding receiving holes on the vehicle body and the vehicle door;

inserting cam bolts into at least one aligned pair of the hinge holes and the receiving holes to temporarily mount the vehicle door while allowing movement of the vehicle door relative to the vehicle body;

adjusting the vehicle door to a desired position relative to the vehicle body by rotating the cam bolts; and inserting first mounting bolts into at least one empty aligned pair of the hinge holes and the receiving holes and replacing the cam bolts with the second mounting bolts to secure the desired position of the vehicle door relative to the vehicle body.

2. The method of claim 1, wherein each arm has a first hinge hole and a second hinge hole adjacent to one another.

3. The method of claim 2, wherein inserting the cam bolts into the at least one aligned pair of the hinge holes and the receiving holes further includes inserting a first cam bolt into a first hinge hole of a body-side arm of the upper door hinge, inserting a second cam bolt into a first hinge hole of a body-side arm of the lower door hinge and inserting a third cam bolt into a first hinge hole of a door-side arm of the lower door hinge.

4. The method of claim 3, wherein adjusting the vehicle door to the desired position relative to the vehicle body further includes rotating each of the first cam bolt, the second cam bolt and the third cam bolt in relation to one another thereby causing translational movement of the vehicle door relative to the vehicle body in an X axis, Y axis and/or Z axis direction.

5. The method of claim 3, wherein adjusting the vehicle door to the desired position relative to the vehicle body further includes rotating the first cam bolt and the second cam bolt in relation to one another thereby changing an angle of the vehicle door relative to the vehicle body.

6. The method of claim 1, wherein the cam bolts each include an eccentric cam lobe and a bolt shaft, the bolt shaft extending through the eccentric cam lobe, the cam bolts each having an offset between a centerline of the eccentric cam lobe and a centerline of the bolt shaft, where the offset may vary relative to each cam bolt.

7. The method of claim 1, wherein rotation of the cam bolts causes translational movement of the vehicle door along an X axis, Y axis and/or Z axis and causes rotational movement of the vehicle door in relation to the vehicle body.

8. The method of claim 1, wherein the desired position is defined by an X axis, Y axis and Z axis positioning required to provide flushness between the vehicle door and the vehicle body and uniform spacing between the vehicle door and a vehicle body frame on the vehicle body.

9. The method of claim 1, wherein adjusting the vehicle door to the desired position relative to the vehicle body further includes rotating at least two of the cam bolts simultaneously to adjust a gap spacing between the vehicle door and a vehicle body frame on the vehicle body.

* * * * *